US012103026B2

(12) United States Patent
Marker

(10) Patent No.: US 12,103,026 B2
(45) Date of Patent: Oct. 1, 2024

(54) METHOD FOR IMPREGNATING A GARMENT AND APPARATUS FOR IMPREGNATING A GARMENT

(71) Applicant: Imbox Shoecare A/S, Egå (DK)

(72) Inventor: René Marker, Auning (DK)

(73) Assignee: IMBOX SHOECARE A/S, Egå (DK)

( * ) Notice: Subject to any disclaimer, the term of this patent is extended or adjusted under 35 U.S.C. 154(b) by 517 days.

(21) Appl. No.: 17/291,019

(22) PCT Filed: Nov. 6, 2019

(86) PCT No.: PCT/DK2019/050338
§ 371 (c)(1),
(2) Date: May 4, 2021

(87) PCT Pub. No.: WO2020/094200
PCT Pub. Date: May 14, 2020

(65) Prior Publication Data

US 2021/0387214 A1 Dec. 16, 2021

(30) Foreign Application Priority Data

Nov. 6, 2018 (DK) .......................... PA 2018 70728

(51) Int. Cl.
*B05B 5/08* (2006.01)
*B05B 14/43* (2018.01)
(Continued)

(52) U.S. Cl.
CPC .............. *B05B 5/082* (2013.01); *B05B 14/43* (2018.02); *B05B 16/60* (2018.02); *D06B 1/02* (2013.01);
(Continued)

(58) Field of Classification Search
CPC ........................ D06F 58/10; D06B 23/04–045
See application file for complete search history.

(56) References Cited

U.S. PATENT DOCUMENTS 4,345,907 A 8/1982 Wegele
5,789,368 A 8/1998 You et al.
(Continued)

FOREIGN PATENT DOCUMENTS

CN 103243529 A 8/2013
CN 107401041 A 11/2017
(Continued)

OTHER PUBLICATIONS

Office Action from Indian Patent App. No. 202147024536 mailed Oct. 17, 2022.
(Continued)

*Primary Examiner* — Spencer E. Bell
(74) *Attorney, Agent, or Firm* — Cermak & McGowan LLP; James Creighton Wray; Malcolm K. McGowan

(57) ABSTRACT

The invention relates to a method and an apparatus for impregnating an item, preferably a garment such as a coat, a jacket, a shirt or a pair of trousers, optionally other fabric-like textile such as tents, tarpaulins, hoods for vehicles or vessels. The apparatus comprises an inner support for supporting the garment or other fabric-like textile. The inner support has an electrically conducting surface and an electrically conducting outer cover for covering the garment or other fabric-like textile when supported by the inner support. The apparatus also comprises means for applying an electro static field between the electrically conducting surface of the inner support and the electrically conducting outer cover, and nozzles for providing an impregnating agent between the electrically conducting surface of the inner support and the electrically conducting outer cover, from the outer cover towards the garment or other fabric-like textile.

8 Claims, 2 Drawing Sheets

(51) Int. Cl.

| | |
|---|---|
| ***B05B 16/60*** | (2018.01) |
| ***D06B 1/02*** | (2006.01) |
| ***D06B 5/24*** | (2006.01) |
| ***D06B 15/04*** | (2006.01) |
| ***D06B 23/04*** | (2006.01) |

(52) U.S. Cl.

CPC ............... *D06B 5/24* (2013.01); *D06B 15/04* (2013.01); *D06B 23/04* (2013.01)

(56) References Cited

U.S. PATENT DOCUMENTS

| | | | | |
|---|---|---|---|---|
| 5,815,961 | A * | 10/1998 | Estes | D06F 73/02 38/14 |
| 8,006,336 | B1 | 8/2011 | Gerlach | |
| 2003/0126691 | A1 * | 7/2003 | Gerlach | D06F 58/10 8/158 |
| 2005/0223502 | A1 * | 10/2005 | Kleker | D06F 17/04 68/5 R |
| 2006/0156475 | A1 | 7/2006 | Oles | |
| 2015/0129672 | A1 | 5/2015 | Matsuura | |

FOREIGN PATENT DOCUMENTS

| | | | |
|---|---|---|---|
| CN | 108311306 | A | 7/2018 |
| CN | 207887434 | U | 9/2018 |
| DE | 6600593 | U | 1/1969 |
| GB | 1406665 | A | 9/1975 |
| GB | 2190927 | A | 12/1987 |
| JP | 2005-518891 | A | 6/2005 |
| JP | 2011-522059 | A | 7/2011 |
| MX | 2015011796 | A | 6/2016 |
| WO | WO03/074776 | A2 | 9/2003 |
| WO | 2-19066808 | A1 | 4/2019 |

OTHER PUBLICATIONS

Office Action from Brazilian Patent Application No. BR112021008757-5 (Jan. 3, 2023).

Office Action from European Patent App. No. 19802066.1 (Jul. 11, 2023).

Office Action from Mexican Patent App. No. MX/a/2021/005259 (Jun. 24, 2024).

* cited by examiner

METHOD FOR IMPREGNATING A GARMENT AND APPARATUS FOR IMPREGNATING A GARMENT

This application claims the benefit of Danish Application No. PA 2018 70728 filed Nov. 6, 2018 and PCT/DK2019/050338 filed Nov. 6, 2019, International Publication No. WO 2020/094200 A1, which are hereby incorporated by reference in their entirety as if fully set forth herein.

FIELD OF THE INVENTION

The present invention relates to impregnating a garment or other fabric-like textile.

BACKGROUND OF THE INVENTION

Impregnating a garment may be needed for making the garment more or less waterproof. Sometimes, garments for outdoor use such as coats are not waterproof, and the user of the garment may want to make the garment at least a little waterproof. Other times, garment for outdoor use is waterproof when new due to the fabric of the garment having been impregnated with a waterproofing agent such as wax or the like. However, during use of the garment, especially in rainy weather, the waterproofing agent is gradually washed out of the fabric of the garment and the garment becomes less and less waterproof. Also during general wear and tear, the mechanical action when washing garments etc. will also cause the weather- and/or waterproofing to diminish. New waterproofing agent needs to be applied by a brush, a sponge or by spraying a waterproofing agent onto the fabric of the garment. Applying new waterproofing agent is often a cumbersome task, and there is a risk of not all parts of the garment being applied with waterproofing agent, or that the amount of waterproofing agent applied varies on different parts of the garment, depending on the skills and effort by the user applying the waterproofing agent, and depending on the ease of access to the different parts of the garment when having to apply by a brush, a sponge or by spraying. When spraying a number of security issues arise, such as the assurance of good ventilation in order not to expose the person applying the impregnating agent to the often poisonous aerosols used in spray cans, and the environmental impact to the ambient surroundings. Furthermore, this varying of application of waterproofing agent may cause discolouring and shading.

Within the context of this disclosure, garment will be used as an example of items which are suitable to be treated with and by the invention. The skilled person will, after having realised the advantages of the present invention, recognise which other items the apparatus and method is suitable to treat as well. Such other items may be tents, tarpaulins, hoods for vehicles or vessels, or even other pieces of equipment benefitting from being impregnated by a water repellent or other impregnating agent. Such other items are referred to as “other fabric-like textiles”.

An object for impregnating garment may also be to avoid moisture, discolouring the surface of the garment and thereby possibly changing the looks of the garment.

Typically, the impregnating process is carried out by an impregnating agent contained in an aerosol can, such that by activating the aerosol can, an impregnating mist is created through the nozzle of the can and by directing the mist at the garment, a layer of impregnating agent is applied to the surface of the garment.

This process is typically carried out outdoors, in that the impregnating agent as well as the aerosols used to propel the impregnating agents have a bad smell and leave stains on the surroundings and, if inhaled, are potentially harmful to the health. Typically the impregnating agent will also contain environmentally dangerous solvents which are altogether undesirable both indoors and outdoors.

OBJECT OF THE INVENTION

It is an object of the invention to make applying impregnating agent to a garment or other fabric-like textile in easier and environmentally better and to ensure an even distribution of impregnating on or in the garment or the other fabric-like textile.

At least within this description impregnating shall be understood as a process where an agent is applied and adhered/absorbed into a surface on an object to be impregnated. Typically the object is a garment, or other fabric-like object, such as for example a (textile) cover, tarpaulin or the like.

The agent which is applied may be a weatherproofing agent, a waterproofing agent, a mosquito or other insect repelling agent. Due to the nature of the present invention the composition of the agents is determined by their ability to utilise the inventive features of the present invention. In some instances it is possible to modify or engineer the impregnating agent such that the agent is suitable to be used with the present invention.

DESCRIPTION OF THE INVENTION

The object of the invention is obtained by a method for impregnating a garment or other fabric-like textile, said method comprising the steps of

- hanging the garment or other fabric-like textile onto an inner support and;
- providing an outer surface spaced from the inner support and the garment or equipment,
- providing a plurality of nozzles, said nozzles capable of creating a mist of impregnating agent in the space created by the inner support and the outer surface, where the mist is circulated in the space;
- evacuating the mist from the space after a predetermined period of time;
- optionally activating a drying cycle either at the same time as evacuating the mist, or immediately after the mist has been evacuated.

In this manner an environmentally safe and friendly impregnating process is created. Furthermore the inner support in addition to supporting the item to be impregnated and making sure that the item is not wrinkled, folded or otherwise has not accessible surfaces which it is desirable to impregnate, also hinders impregnating agent from being adhered to the inner side of the garment. This has two advantages; firstly the amount of impregnating agent used may be less, and secondly although the impregnation process provides a substantially evenly distributed layer of impregnating agent across the surface, surplus agent may assemble. This can give rise to spillover/marking to the user’s other clothing.

In a further advantageous embodiment of the invention the inner support and the outer surface are electrically conductive, such that the garment is arranged between the inner support and the outer surface and;

providing an electrostatic field between said inner support and said outer surface across said garment or other fabric-like textile, providing an impregnating agent within the electrostatic field on an outer side in relation to the outer side of the garment or other fabric-like textile, the impregnating agent being electrically charged and being sprayed towards the outer side of the garment or other fabric-like textile, and the impregnating agent being applied on the outer side of the fabric of the garment or other fabric-like textile and/or into the fabric of the garment or other fabric-like textile.

Impregnating a garment or other fabric-like textile by use of an electrostatic field makes it easier to impregnate a garment or other fabric-like textile and makes the impregnating agent more evenly distributed. The amount of impregnating agent used is optimised when the impregnating agent is evenly distributed to the garment or other fabric-like textile. Also, all parts of the garment or other fabric-like textile are impregnated and all parts of the garment or other fabric-like textile are impregnated with the same amount of impregnating agent.

This is due to the fact that as the impregnating agent covers the garment surface the electrical field will change, such that the electrically charged impregnating particles making up the impregnating spray (mist) will be attracted to areas where the electrical field has a higher attraction, corresponding to areas which have not already been covered by impregnating agent.

In this connection the term “applied to” and “into the fabric” shall be understood as the impregnating agent is applied, adhered, absorbed or otherwise integrated into the textile in such a manner that a long time effect is obtained, and a thorough application for the particular agent is achieved, at least comparable to prior art methods of applying similar impregnating agents.

In one aspect of the method according to the invention, a coat, a jacket or a shirt and/or a pair of trousers to be impregnated are supported by a support structure, or where a coat, a jacket or a shirt to be impregnated is supported by a mannequin torso, or where a pair of trousers to be impregnated is supported by mannequin legs.

In a further embodiment of the method preceding the step of creating a mist of impregnating agent a further set of nozzles arranged for issuing a cleaning agent towards the garment or other textile like material arranged on the inner support are activated, where the cleaning agent comprises non-ion and/or amphoteric surfactants, glycerine, lactic acid amine salt and water, and where after a predetermined time after having applied the cleaning agent to the garment or other textile like material, the cleaning agent is removed from the garment or other textile material, preferably by blasting compressed air towards the garment or other textile material, and collecting the polluted remains in a second filter unit.

The application of a cleaning agent and its subsequent removal leaves the surface of the garment free from fats and/or oils such that the surface is better prepared for receiving and binding the impregnating agent to the material of the garment. The cleaning agent will be removed by blasting compressed air towards the garment/inner support. After the blasting of compressed air facilitated by a further set of nozzles, the remains, i.e. the cleaning agent with its content of pollutants removed from the garment, will be collected in a second filter unit. Typically this filter unit is provided with a removable and cleanable filter.

The support structure may typically be a body mannequin or a suitable part of a mannequin (for example lower part when trousers/pants are to be impregnated, upper torso part for shirts, jackets etc.).

In a possible aspect of the method according to the invention the mannequin or section of mannequin is inflatable and the mannequin is inflated prior to supporting the coat, the jacket, the shirt or the trousers.

In order to provide an environment friendly impregnating agent the invention proposes in the method to use an impregnating agent which is a liquid containing the following compounds:

a. 2-20 wt % more preferred 4-12 wt %, and most preferred 7-8 wt % of an aqueous C6-fluorocarbon cationic polar dispersion binder with 2% active C6;

b. 1-15 wt % ethanol or other volatile organic solvent;

c optionally a can preservative;

d. the remainder up to 100% deionised water.

The object of the invention mays also be obtained by an apparatus for impregnating a garment such as a coat, a jacket, a shirt or a pair of trousers, said apparatus comprising in a closable housing an inner support for supporting the garment:

an outer surface spaced from but facing the inner support;

a plurality of nozzles distributed for creating a mist in the space between the inner support and the outer surface;

an evacuation system for evacuating surplus impregnating mist, said evacuation system optionally comprising a filter unit, where said filter at least removes or neutralizes one or more of the following: odour, volatile solvents, any binder residue or dust;

a control unit comprising pre-programmed treatment regimes, selectable by a user on a user interface, and means for controlling the features of the apparatus to carry out a selected regime.

Such an apparatus is suitable to performing the method disclosed above. Furthermore, particularly in the embodiment where a filter unit is provided, the apparatus may for example be used in a shop or home environment without any special measures relating to ventilation, handling of potentially poisonous liquids or gasses etc. The apparatus is completely self-sufficient (needs only power).

In a further advantageous embodiment the inner support has an electrically conducting surface, and said apparatus also having an electrically conducting outer surface, spaced from and substantially covering the garment when supported by the inner support, where the electrically conducting surface of the inner support is intended for facing an inner side of the garment, when the garment is supported by the inner support, where the electrically conducting outer surface is intended for facing an outer side of the garment, when the garment is supported by the inner support, where the apparatus comprises means for applying an electrostatic field between the electrically conducting surface of the inner support and the electrically conducting outer surface, where the apparatus comprises means for providing an impregnating agent between the electrically conducting surface of the inner support and the electrically conducting outer surface, and where the impregnating agent is polar such that, when the electrostatic field is applied, the polar impregnating agent is directed away from the electrically conducting outer surface and towards the electrically conducting surface of the inner support and is applied to and/or absorbed by the garment or other fabric-like textile.

The electrical field in combination with the polar impregnating liquid/mist will make the impregnating particles being attracted to the inner support. As this inner support is covered by the garment to be impregnated, it is assured that the particles come into contact with the garment. Furthermore, as the surface of the garment is being more and more covered with impregnating agent, the electrical field will diminish in such an area due to the insulation created by the impregnated item, whereas other areas of the item not having been thoroughly impregnated will still have an attraction for the impregnating particles. In this manner a more even and complete impregnation is achieved.

In one embodiment of the apparatus according to the invention, the inner support is inflatable between a non-inflated collapsed state and an inflated expanded state.

In a possible embodiment of the invention, the electrically conducting surface is a plate or a corpus or a mesh of an electrically conducting material, integral with the material which the inner support is made of, or where the electrically conducting surface is a separate foil or a mesh applied to a surface of an electrically non-conducting inner support.

In another possible embodiment of the apparatus according to the invention the electrically conducting outer surface is a foil or a mesh, and said foil or mesh having a shape in an expanded state being congruent to a shape of the inner support, and said foil or mesh having a size in an expanded state being larger than an outer size of a part of the inner support, which electrically conducting outer cover is intended for covering the garment or other fabric-like textile and for covering the inner support supporting the garment, during impregnation of a garment or other fabric-like textile.

In yet another embodiment of the apparatus according to the invention, the electrically conducting outer cover is at least one inner surface of a box enclosing the inner support, and enclosing the garment or other fabric-like textile supported by the inner support during impregnation of the garment or other fabric-like textile.

The impregnating agent may be provided by a plurality of fixed spray nozzles provided in the vicinity of the garment or other fabric-like textile, when the garment or other fabric-like textile is supported by the inner support during impregnation of the garment, said plurality of fixed spray nozzles being positioned in relation to the garment or other fabric-like textile, during impregnation of the garment, for spraying the impregnating agent onto various parts of the garment or other fabric-like textile.

In the alternative, or additionally, the impregnating agent may be provided by one or more nozzles arranged on one or more displaceable spray booms, the one or more displaceable spray booms provided along at least one surface of the box, and the one or more displaceable spray booms spraying a mist of impregnating agent into the box during impregnation of the garment or other fabric-like textile during displacement of the one or more spray booms in the vicinity of the garment or other fabric-like textile, when the garment or other fabric-like textile is supported by the inner support during impregnation of the garment or other fabric-like textile.

In a further embodiment of the apparatus according to the invention a further set of nozzles are provided for issuing a cleaning agent towards the garment or other textile like material arranged on the inner support, where the cleaning agent comprises non-ion and/or amphoteric surfactants, glycerine, lactic acid amine salt and water, and where after a predetermined time after having applied the cleaning agent to the garment or other textile like material, a further set of nozzles or the same nozzles as used for issuing cleaning agent is used for issuing compressed air towards the garment or other textile material, and where a second filter unit is provided for collecting the polluted remains.

The term "impregnating agent" is to be understood as any usually liquid or gaseous substance which it is desirable to apply to a surface in order to obtain certain characteristics such as water repellence, colour, subtleness and the like. Examples may be silicon based water repellent impregnating agents, solvent containing fatty/oily substances or various colouring agents. Also solvent-free agents may be used.

A particular preferred impregnating agent is a liquid containing the following compounds:

a. 2-20 wt % more preferred 4-12 wt %, and most preferred 7-8 wt % of an aqueous C6-fluorocarbon cationic polar dispersion binder with 2% active C6;

b. 1-15 wt % ethanol or other volatile organic solvent;

c optionally a can preservative;

d. the remainder up to 100% deionised water.

The term "mist", is to be understood as a relatively dense collection of miniscule droplets which are issued from nozzles.

DETAILED DESCRIPTION OF THE INVENTION

Figure 1:
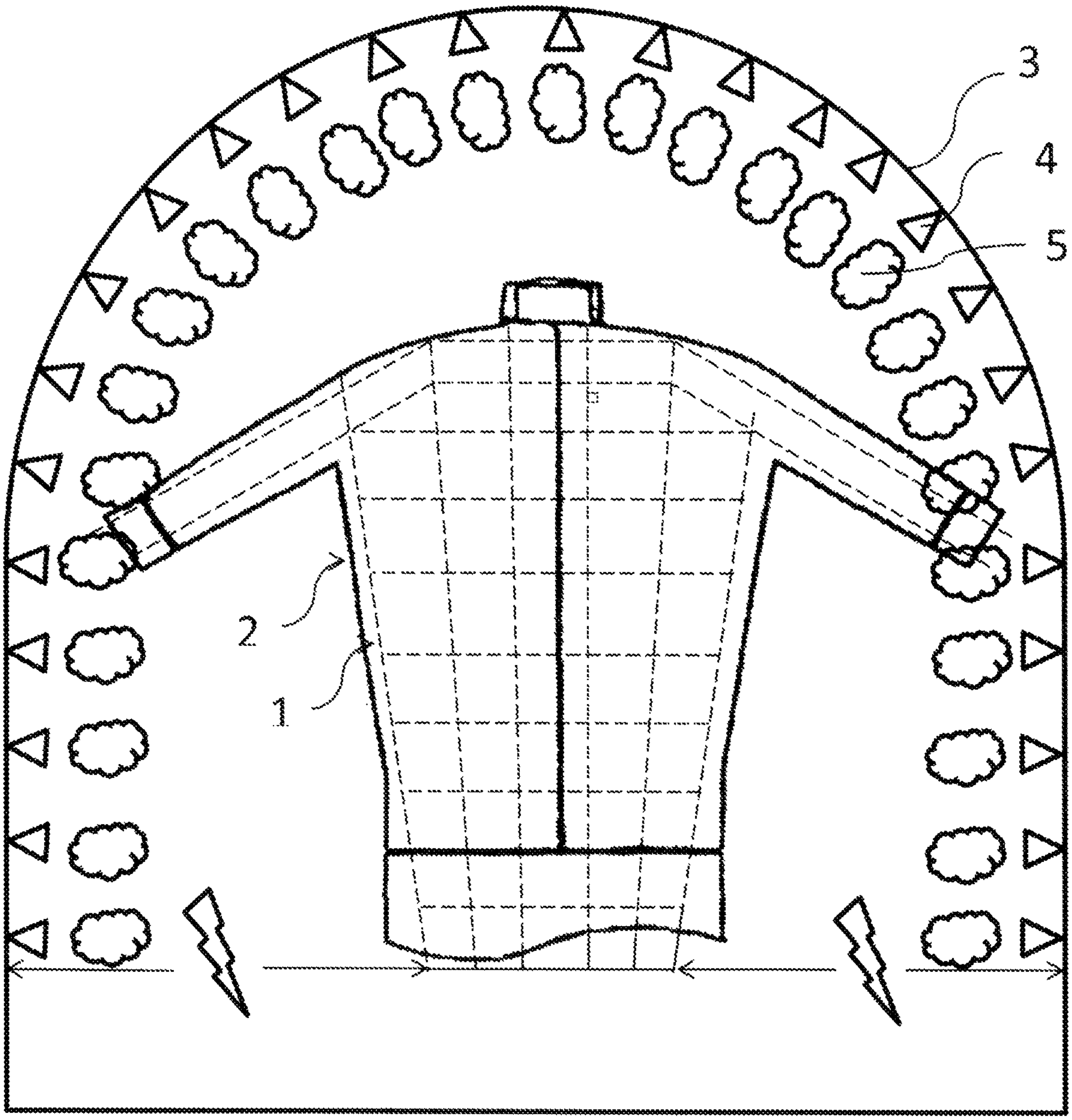
FIG. 1 schematically illustrates the apparatus for impregnating a garment in a first embodiment.

The drawing shows an apparatus for impregnating a garment such a coat, a jacket or shirt. Other pieces of garment such as trousers, gloves or shoes may also be impregnated in an apparatus according to the invention. Even pieces of equipment not being a garment, such as tents, tarpaulins, hoods for vehicles or vessels, or even other pieces of equipment benefitting from being impregnated by a water repellent or other impregnating agent may be impregnated by an apparatus according to the invention.

The apparatus has an inner support for supporting the garment or other fabric-like textile.

In the embodiment shown, the apparatus comprises an inner support being a mannequin torso 1. The mannequin torso 1 may either be made of an electrically non-conducting material like wood or rigid polymer, but having an electrically conducting material applied to or embedded in the surface, or the mannequin torso may be made of an electrically conducting material like steel.

If the mannequin torso 1 is made of an electrically non-conducting material, the material of the mannequin torso 1 must be provided with an electrically conducting surface. Alternatively to the mannequin torso 1 being provided with an electrically conducting surface, a separate foil or mesh made of, or at least including, an electrically conducting material may be loosely applied and cover the mannequin torso 1.

The mannequin torso 1 is preferably situated in an electrically conducting outer cover 3, a box for covering the mannequin torso 1 and the garment 2 supported by the mannequin torso 1, during impregnation of the garment 2. The electrically conducting outer cover 3 constitutes a box enclosing the mannequin. Inside the box, spray nozzles 4 are provided for spraying impregnating agent onto the garment 2. In the embodiment shown, the spray nozzles 4 are fixed along an inner sidewall of the outer cover 3, the inner surface of the box thereby constituting the outer surface, as discussed above.

According to an alternative embodiment, the outer cover may be a foil or a mesh for covering the mannequin torso 1, possibly inside a box, to keep the impregnating agent away from the surroundings. In the alternative embodiment, the outer cover has a shape congruent with the shape of the mannequin torso 1, but a size larger than the mannequin torso 1, so that the outer cover is capable of covering both the mannequin torso 1 and a garment 2 such as a jacket supported by the mannequin torso 1.

The size of the outer cover will be so that a gap is provided between the mannequin torso 1 and the outer cover. The size of the gap must be large enough to accommodate the garment 2, but is preferably also limited to reduce a distance between the mannequin torso 1 and the outer cover. Reducing the distance between the mannequin torso 1 and the outer cover also reduces the required electrical voltage to be applied between the mannequin torso 1 and the outer cover.

When the outer cover 3 covers the mannequin torso 1 and the garment 2 such as a jacket, an electrostatic field is to be provided between the mannequin torso 1 and the outer cover.

Therefore, the distance between the mannequin torso 1 and the outer cover is preferably limited, so that the magnitude of the electrostatic field need not be too large, in order to reduce the electrical power needed for providing the electrostatic field. However, as mentioned, the distance between the mannequin torso 1 and the outer cover must be large enough to accommodate various garments or pieces of equipment supported by the mannequin torso 1 for impregnation by the new method and the new apparatus. The distance between the outer cover and the garment shall also be sufficient for the impregnating mist to be able to spread out, and provide a substantially continuous impregnating mist over the garment.

The method of applying an impregnating agent to the garment 2 by use of the embodiment of an apparatus as shown will hereafter be described.

A garment 2 or other fabric-like textile to be impregnated is supported by the mannequin torso 1 or other supporting structure inside the box 3. As example, the garment 2 is supported on and by the outer surface of the mannequin torso 1 with inner of the garment 2 facing the mannequin torso 1, and the outer of the garment 2 facing the interior of the box 3.

The box 3 is closed and an electrostatic field is applied between one or more of the inner sidewalls of the box 3 and the outer surface of the mannequin torso 1. When the electrostatic field has been applied, the impregnating agent 5 is sprayed into the interior of the box 3 by the one or more spray nozzles 4 extending along inner sidewalls of the box 3.

Spraying of impregnating agent 5 into the box creates a mist of impregnating agent filling the box 3. The mist of impregnating agent 5 is electrostatically charged and because of the electrostatic field between one or more of the sidewalls of the box 3 and the outer surface of the mannequin torso 1, the mist is directed from the one or more sidewalls of the box and towards the outer surface of the mannequin torso 1.

Because the garment 2 is supported by the mannequin torso 1 and therefore covers the mannequin torso 1, the mist is applied to the garment 2. Depending on the viscosity of the impregnating agent, depending on the size of the droplets of the mist of impregnating agent, depending on the magnitude of the electrostatic field and depending on the texture and denier of the fabric, the droplets are either applied only to the surface of the garment 2 or is also partly or fully absorbed by the fabric of the garment 2.

After a period of time, spraying of impregnating agent 5 is stopped, and the electrostatic field is shut off. The garment 2 may be finally impregnated as wished, or the garment 2 may be subjected to further treatment, possibly heating, for the fabric to better absorb the impregnating agent 5, or cooling for the impregnating agent 5 to become more solid and possibly better at repelling, e.g., water from the garment. The impregnating agent may also be of the type where an after treatment may be curing, and therefore suitable curing means, for example UV-lights may be provided inside the box.

Figure 2:
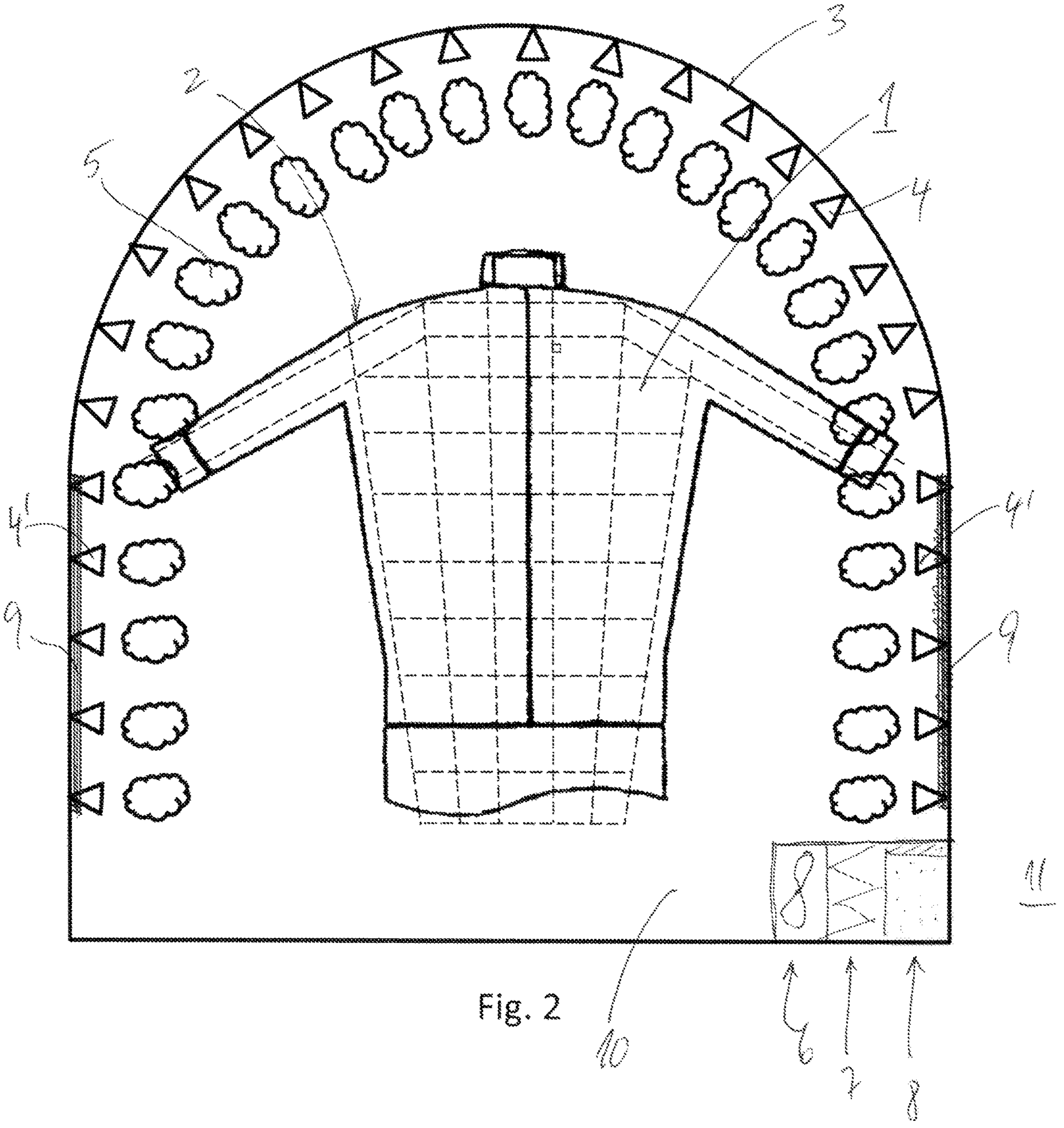
FIG. 2 schematically illustrates the apparatus for impregnating a garment in a second embodiment.

In FIG. 2 is illustrated another embodiment where the torso 1 is provided with a garment 2 in the form of a shirt. The garment 2 is covering the inner support 1 such that only the outer surface of the garment is available for receiving the impregnating mist 5 being issued from the nozzles 4. Furthermore, some of the nozzles 4' are arranged on booms such that by moving the booms 9 it is possible for example to circulate the booms along the outer periphery of the outer cover 3 such that a more widely spread mist of impregnating liquid may be obtained surrounding the garment 2.

Furthermore, the apparatus depicted in FIG. 2 is provided with an evacuation unit 10 such that mist and other both liquid and gasses may be evacuated from the inside of the housing. In this embodiment the evacuation unit 10 comprises a ventilator 6 which can create an airflow to the outside 11 and where the airflow (or gas flow) is passed through a first filter 7, for example being an active carbon filter neutralizing any odours and secondly through a further gas filter 8 which by precipitation is able to precipitate any volatile solvents from the gas flow through the filter unit and evacuation unit 10.

The invention claimed is:

1. Apparatus for impregnating a garment such as a coat, a jacket, a shirt or a pair of trousers or other fabric-like textile such as tents, tarpaulins, hoods for vehicles or vessels, said apparatus comprising:

- an inner support in a closable housing for supporting the garment;
- an outer surface spaced from but facing the inner support;
- a plurality of nozzles distributed for creating a mist in the space between the inner support and the outer surface;
- an evacuation system for evacuating surplus impregnating mist, said evacuation system optionally comprising a filter unit, where said filter unit at least removes or neutralizes one or more of the following: odour, volatile solvents, any binder residue or dust;
- a control unit comprising pre-programmed treatment regimes, selectable by a user on a user interface, and configured to control the apparatus to carry out a selected regime; and further that said inner support has an electrically conducting surface, and said apparatus also having an electrically conducting outer surface, spaced from and substantially covering the garment when supported by the inner support,

- where the electrically conducting surface of the inner support is intended for facing an inner side of the garment, when the garment is supported by the inner support,
- where the electrically conducting outer surface is intended for facing an outer side of the garment, when the garment is supported by the inner support, where the apparatus is configured to apply an electrostatic field between the electrically conducting surface of the inner support and the electrically conducting outer surface, where the apparatus is configured to provide an impregnating agent between the electrically conducting surface of the inner support and the electrically conducting outer surface, and where the impregnating agent is polar such that, when the electrostatic field is applied, the polar impregnating agent is directed away from the electrically conducting outer surface and towards the electrically conducting surface of the inner support and is applied to and/or absorbed by the garment or other fabric-like textile.

2. Apparatus according to claim 1, wherein a further set of nozzles are provided for issuing a cleaning agent towards the garment or other textile like material arranged on the inner support, where the cleaning agent comprises non-ion and/or amphoteric surfactants, glycerine, lactic acid amine salt and water, and where after a predetermined time after having applied the cleaning agent to the garment or other textile like material, a further set of nozzles or the same nozzles as used for issuing cleaning agent is used for issuing compressed air towards the garment or other textile material, and where a second filter unit is provided for collecting the polluted remains.

3. Apparatus according to claim 1, where the inner support of the apparatus is inflatable between a non-inflated collapsed state and an inflated expanded state.

4. Apparatus according to claim 1, where the electrically conducting surface of the inner support is a plate or a corpus or a mesh of an electrically conducting material, integral with the material which the inner support is made of, or where the electrically conducting surface of the inner support is a foil or a mesh applied to a surface of an electrically non-conducting inner support, separate from the material which the inner support is made of.

5. Apparatus according to claim 1, where the electrically conducting outer surface is a foil or is a mesh, and said foil or mesh having a shape in an expanded state being congruent to a shape of the inner support, and said foil or mesh having a size in an expanded state being larger than an outer size of a part of the inner support, which electrically conducting outer surface is intended for covering the garment or other fabric-like textile and for covering the inner support supporting the garment, during impregnation of a garment or other fabric-like textile.

6. Apparatus according to claim 1, where the electrically conducting outer surface is at least one inner surface of a box or the closeable housing enclosing the inner support and enclosing the garment supported by the inner support during impregnation of the garment or other fabric-like textile, and said box or the closeable housing having an aperture for allowing at least a garment or other fabric-like textile to be inserted into the box or the closeable housing, allowing both a garment or other fabric-like textile and an inner support to be inserted into the box or the closeable housing.

7. Apparatus according to claim 1, where the impregnating agent is issued by a plurality of nozzles arranged on one or more displaceable spray booms, the one or more displaceable spray booms provided along at least one surface of the closable housing, and the one or more displaceable spray booms spraying a mist of impregnating agent into the space between the inner support and the outer surface during impregnation of the garment or other fabric-like textile during displacement of the one or more spray booms in the vicinity of the garment or other fabric-like textile, when the garment or other fabric-like textile is supported by the inner support during impregnation of the garment or other fabric-like textile.

8. Apparatus according to claim 1, wherein the impregnating agent is a liquid containing the following compounds:

a. 2-20 wt % more preferred 4-12 wt %, and most preferred 7-8 wt % of an aqueous C6-fluorocarbon cationic polar dispersion binder with 2% active C6;

b. 1-15 wt % ethanol or other volatile organic solvent;

c. optionally a preservative;

d. the remainder up to 100% deionised water.

* * * * *